United States Patent [19]

Horie et al.

[11] Patent Number: 5,493,401

[45] Date of Patent: Feb. 20, 1996

[54] METHOD OF MEASURING FILM THICKNESSES

[75] Inventors: Masahiro Horie; Nariaki Fujiwara; Masahiko Kokubo, all of Kamikyo, Japan

[73] Assignee: Dainippon Screen Mfg. Co., Ltd., Japan

[21] Appl. No.: 309,164

[22] Filed: Sep. 20, 1994

[30] Foreign Application Priority Data

Sep. 20, 1993 [JP] Japan .................................. 5-257853

[51] Int. Cl.$^6$ .................................. G01B 11/06
[52] U.S. Cl. .................................. 356/382; 250/559.26
[58] Field of Search .................................. 356/381, 382; 250/560, 559.26

[56] References Cited

U.S. PATENT DOCUMENTS

4,999,508 3/1991 Hyakumura .................... 356/382
4,999,509 3/1991 Wada et al. .................... 250/560

*Primary Examiner*—F. L. Evans
*Attorney, Agent, or Firm*—Ostrolenk, Faber, Gerb & Soffen

[57] ABSTRACT

Light of an observation wavelength range is irradiated upon a sample object to measure spectral reflection ratios, and an waveform is developed from the spectral reflection ratios. Based on the total number of peaks and valleys found in the interference waveform and two wavelengths specified within the observation wavelength range, possible ranges for the film thicknesses of the respective transparent films are determined. While changing tentative film thicknesses of the respective transparent films each by a predetermined film thickness pitch within the film thickness ranges, a deviation between theoretical spectral reflectance and measured spectral reflectance with respect to the tentative film thicknesses is calculated to thereby find a film thickness combination which causes the deviation to be minimum.

4 Claims, 5 Drawing Sheets

METHOD OF MEASURING FILM THICKNESSES

BACKGROUND OF THE INVENTION

1. Field of the Invention

The present invention relates to a non-contact and non-destructive measurement method of measuring film thicknesses of one or more transparent films of a sample object which is to be measured (hereinafter "sample object") in which the one or more transparent films are stacked on a substrate.

2. Description of the Background Art

To measure a film thickness of a transparent film of a sample object in which the transparent film is disposed on a substrate, a measurement method utilizing spectral reflectances is previously known. In this measurement method (hereinafter "first conventional method"), a sample object is irradiated with light of a certain observation wavelength range. Spectral reflectances for the sample object are measured to obtain an interference waveform. The number of peaks and valleys in the interference waveform and wavelengths corresponding to the peaks and valleys are then identified, and the film thickness d is calculated from these data. More specifically, the film thickness d is calculated as:

$$d = 0.25 \times \frac{m-1}{\frac{n1}{\lambda1} - \frac{n2}{\lambda2}} \quad [1]$$

where:
- $\lambda1$: the wavelength of a peak or a valley of the shorter wavelength side
- $\lambda2$: the wavelength of a peak or a valley of the longer wavelength side
- $n1$: the refraction index of the transparent film at the wavelength $\lambda1$
- $n2$: the refraction index of the transparent film at the wavelength $\lambda2$
- $m$: the total number of the peaks and the valleys in the observation wavelength range However, if the sample object is formed by a plurality of transparent films which are stacked one atop the other on a substrate, it is impossible to measure the film thicknesses of the transparent films by the first conventional method. When light is irradiated upon the multilayered sample object and spectral reflectances are measured, interference within and between the transparent films are included in the measured spectral reflectances.

To deal with this, techniques for measuring film thicknesses of transparent films of a multilayered sample object have been developed in recent years. One example is a technique disclosed by U.S. Pat. No. 4,999,509 (hereinafter "second conventional method"). In the second conventional method, film thickness ranges for the respective transparent films are inputted in advance, and the film thicknesses of the transparent films of the multilayered sample object are calculated by global optimization and local optimization.

Thus, when a sample object includes only one transparent film disposed on a substrate, the film thickness of the transparent film is measured by the first conventional method. On the other hand, when a sample object has a multilayered structure in which a plurality of transparent films are formed on a substrate, the film thicknesses of the respective transparent films are measured by the second conventional method.

Nevertheless, the first conventional method has a limited success in measuring a film thickness of a transparent film. Since a precondition for the first conventional method is that an interference waveform includes two or more peaks and valleys, if the interference waveform does not include peaks or valleys or the interference waveform includes only one peak or valley if not at all because the transparent film is relatively thin, it is impossible to measure the film thickness of the transparent film.

Neither the second conventional method is satisfactory since the second conventional method forces an operator an inconvenience of inputting film thickness ranges for the respective transparent films in advance for later global optimization. Although this inconvenience is avoided by inputting a sufficiently large film thickness range, such will instead increase the number of computation steps and unbearably lengthen a computation time. In addition, since a value calculated as a result of optimization largely varies depending on a starting point of optimization (i.e., the value of a film thickness of each transparent film) and other optimization parameters, a reproduction accuracy of measurement greatly drops depending on set conditions.

Although a combination of the first and second conventional methods makes it possible to deal with at least one or more transparent films of a sample object, this combination has a disadvantage that the film thickness measurement methods must be switched each other depending on the number of the transparent films at the expense of measurement process simplicity.

SUMMARY OF THE INVENTION

In a first aspect of the present invention, a method of measuring thicknesses of one or more transparent films of a sample object which are stacked on a substrate of the sample object comprises the steps of: (a) inputting the number of the transparent films and optical constants of each one of the transparent films; (b) irradiating light of a predetermined observation wavelength range upon the sample object, measuring spectral reflectances and deriving an interference waveform; (c) finding the total number of peaks and valleys in the interference waveform and determining possible film thickness ranges for the transparent films based on the total number of peaks and valleys and first and second wavelengths which are respectively located in a shorter wavelength side and a longer wavelength side within the observation wavelength range; and (d) calculating a deviation between theoretical spectral reflectance and measured spectral reflectance with respect to tentatively determined film thickness values while changing the tentatively determined film thickness values each by a predetermined film thickness pitch within the possible film thickness ranges to find a film thickness combination which causes the deviation to be minimum, thereby finally determining the thicknesses as the thicknesses of said transparent films.

In a second aspect of the present invention, the step (c) includes the steps of: (c-1) finding the total number of peaks and valleys in the interference waveform; (c-2) judging whether the total number is less than 2 or not; (c-3) determining a wavelength which is related to a peak or a valley which is located on the shorter wavelength side in the interference waveform as the first wavelength and determining a wavelength which is related to a peak or a valley which is located on the longer wavelength side in the interference waveform as the second wavelength if the total number is not less than 2 to thereby determine the possible film thickness ranges of the transparent films based on the first and second wavelengths; and (c-4) calculating an approximate total number of peaks and valleys which could be found within the observation wavelength range as the total number based on wavelengths which are located at the shortest and longest wavelength sides and the optical constants regarding the transparent films if the total number is less than 2, determining the wavelength which is located at the shortest wavelength side of the observation wavelength range as the first wavelength while determining the wavelength which is located at the longest wavelength side of the observation wavelength range as the second wavelength, and thereafter determining the possible film thickness ranges of the transparent films based on the approximate total number of peaks and valleys and the first and second wavelengths.

In a third aspect of the present invention, the step (c-3) includes a step of calculating a sum of optical thicknesses of the transparent films based on the first and second wavelengths and the total number of peaks and valleys found at the step (c-1) and thereafter determining a certain range around the sum as a first condition for a film thickness combination. The step (c-4) includes a step of determining a certain range around the approximate total number of peaks and valleys as a second condition for a film thickness combination. The step (d) includes a step of judging whether the tentatively determined film thicknesses satisfy the first and second conditions for a film thickness combination prior to calculation of a deviation between theoretical spectral reflectance and measured spectral reflectance with respect to the tentatively determined film thicknesses, and thereafter calculating a deviation only when the first and second conditions for a film thickness combination are satisfied.

In a fourth aspect of the present invention, prior to the step (d), the film thickness pitch is set for each one of the transparent films at a value which is smaller than a film thickness change which causes the total number of peaks and valleys appearing in the interference waveform to change by 1 with a change in the tentatively determined film thicknesses. The film thickness combination which is found at the step (d) is optimized by nonlinear optimization in finding thicknesses of the one or more transparent films.

Thus, according to the first aspect of the present invention, the sample object is illuminated with light of the predetermined observation wavelength range to measure spectral reflectances, and an interference waveform is developed from the spectral reflectances. The total number of peaks and valleys in the interference waveform is found, and the possible film thickness ranges of the respective transparent films are determined based on the total number of the peaks and valleys and the first and second wavelengths which are respectively specified in the shorter and the longer wavelength sides within the observation wavelength range. Hence, there is no need to input the film thickness ranges prior to measurement of film thicknesses. Further, the total number of the computation steps is reduced, which drastically shortens the computation time. Still further, by performing predetermined measurement processes, it is possible to measure the film thicknesses of the respective transparent films regardless of the number of the transparent films.

According to the second aspect of the present invention, upon finding the total number of the peaks and valleys in the interference waveform, it is judged whether the total number is less than 2 or not. The possible film thickness ranges of the respective transparent films are determined in accordance with a result of the judgement. Hence, the film thickness ranges are accurately determined, which in turn improves the reliability of calculation of the film thicknesses.

According to the third aspect of the present invention, a possible combination of the film thickness values, i.e., the first and second conditions for a film thickness combination are determined. Before calculating a deviation between the theoretical spectral reflectance and the measured spectral reflectance with respect to the tentatively determined film thicknesses, whether the tentatively determined film thicknesses satisfy the first and second conditions is judged. Calculation of a deviation is performed only when the first and second conditions are satisfied. In other words, when the first and second conditions are not satisfied, that is, when the combination of the film thicknesses is apparently improper, calculation of a deviation is omitted. This further reduces the computation time.

According to the fourth aspect of the present invention, since the film thickness combination which is found at the step (d) is optimized by nonlinear optimization, the film thicknesses of the respective transparent films are calculated even more accurately.

Accordingly, it is an object of the present invention to offer a method of measuring film thicknesses of one or more stacked transparent films of a sample object without increasing the number of computation steps, without pre-measurement inputting of data and without changing measurement process in accordance with the number of the stacked transparent films.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Structure of Film Thickness Measurement Apparatus

Figure 1:
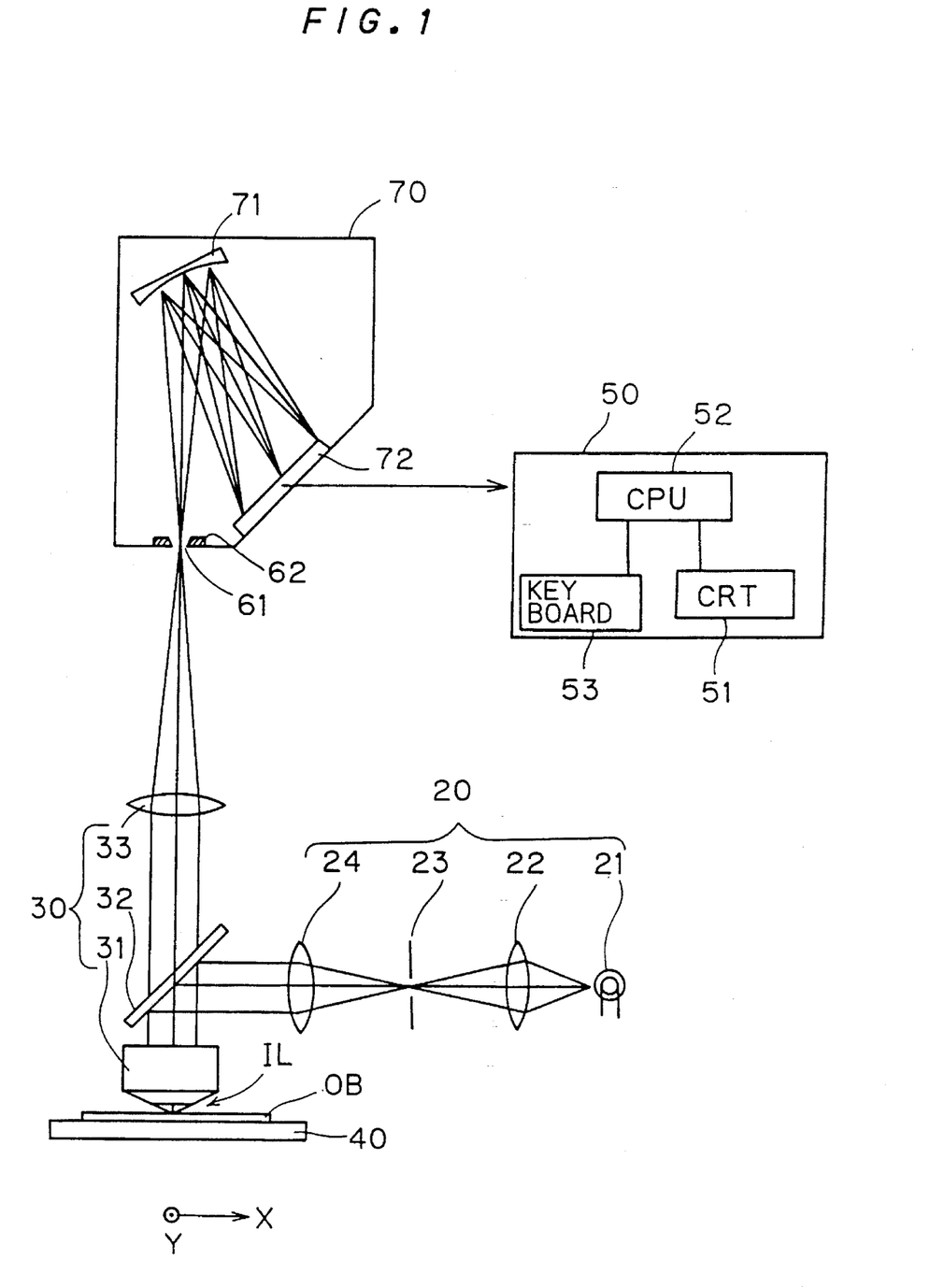
FIG. 1 is a view of a film thickness measurement apparatus to which a film thickness measurement method of the present invention is applicable.

FIG. 1 is a view of a film thickness measurement apparatus to which a film thickness measurement method of the present invention is applicable. The film thickness measurement apparatus comprises an illumination optical system 20 and an imaging optical system 30. The illumination optical system 20 includes a light source 21 which is formed by a halogen lamp so as to emit light of a certain observation wavelength range (e.g., 400 to 800 nm). Light from the light source 21 enters the imaging optical system 30 through a condenser lens 22, a field stop 23 and a condenser lens 24.

The imaging optical system 30 consists of an objective lens 31, a beam splitter 32 and a tube lens 33. Light from the illumination optical system 20 is reflected by the beam splitter 32 and irradiated upon a designated illumination position IL through the objective lens 31.

An XY stage 40 is disposed in the vicinity of the illumination position IL. The XY stage 40 mounts a sample object OB in which one or more transparent films (e.g., a silicon oxide film and a silicon nitride film) are formed on a substrate. Moving in directions X and Y in response to a control signal received from an XY stage driving circuit (not shown), the XY stage 40 registers a desired surface region of the sample object OB to the illumination position IL. Although not shown in FIG. 1, the XY stage 40 is equipped with a device for detecting the position of the XY stage 40 (i.e., an X-coordinate and a Y-coordinate). The information about the position of the XY stage 40 is supplied to a control unit 50 which controls the apparatus as a whole.

Light reflected at the region of the sample object OB (film thickness) measurement region) which is registered to the illumination position IL is converged to a designated point on an optical axis through the objective lens 31, the beam splitter 32 and the tube lens 33. A plate 62 having a pin hole 61 in the center is disposed in the vicinity of the light convergent position. Of the reflected light, light passing through the pin hole 61 is allowed into a spectroscopic unit 70. The spectroscopic unit 70 is comprised of a concave diffraction grating 71 for separating the reflected light into spectrum components and an optical detector 72 for detecting spectrum components of the diffracted light. The optical detector 72 is formed by a photo diode array or a CCD, for example, and is disposed in optical conjugation with the pin hole 61. Hence, light received by the spectroscopic unit 70 is separated into spectrum components by the concave diffraction grating 71, and spectral signals corresponding to the energies of relevant spectrum components are provided to the control unit 50 from the optical detector 72. In the control unit 50, the film thicknesses of the transparent films which are formed in the sample object OB are measured in accordance with the spectral signals by a method which will be described later. The control unit 50 then outputs measurements to a CRT 51. As shown in FIG. 1, the control unit 50 comprises a conventional CPU 52 which performs logic computations. Signals are transmitted between the CPU 52 and the CRT 51 and a key board 53 through an input/output port not shown.

B. Operation of Film Thickness Measurement Apparatus (Procedures of Measurement)

Figure 2:
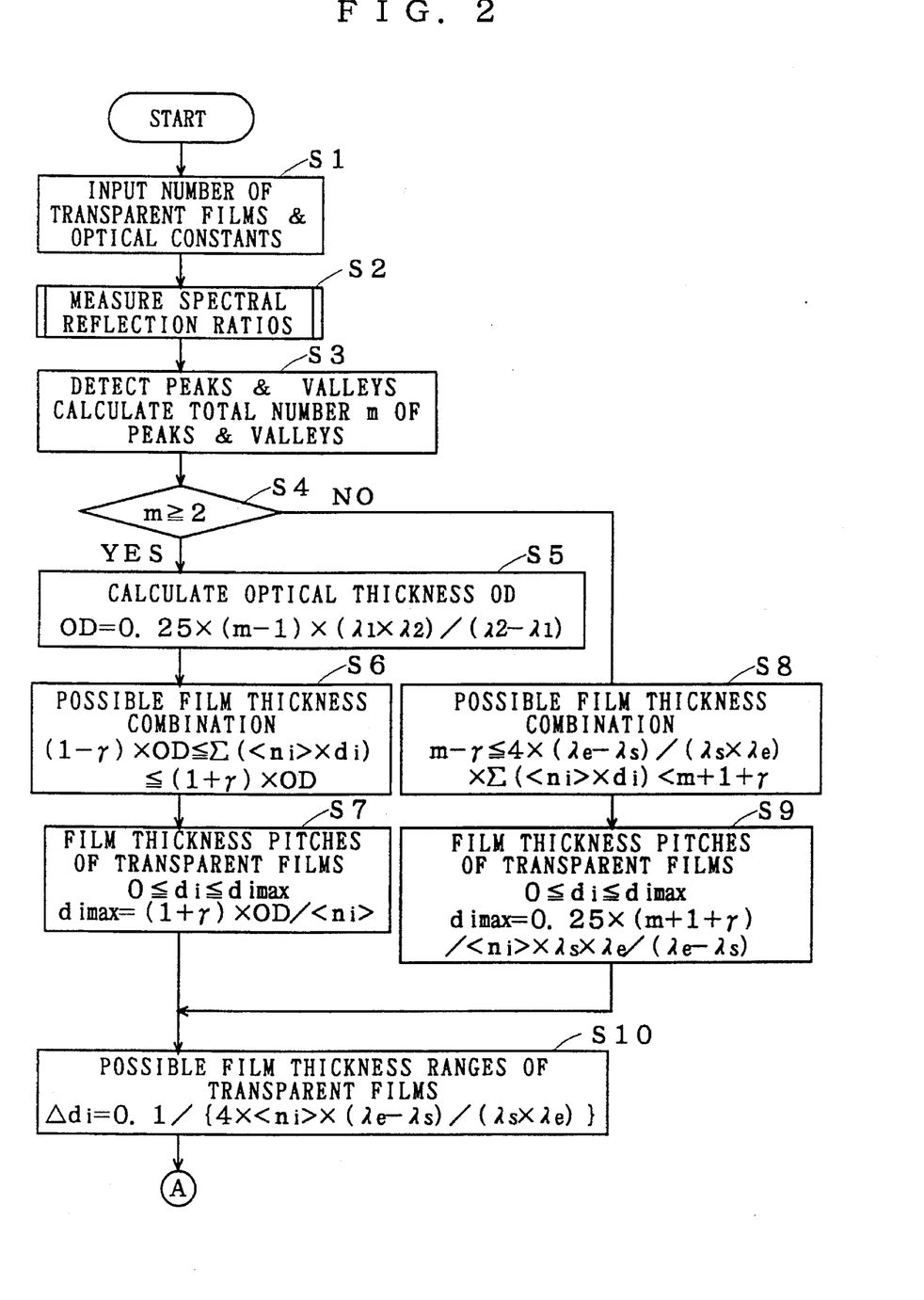
FIGS. 2 and 3 are flow charts showing a film thickness measurement method according to a preferred embodiment of the present invention.
Figure 3:
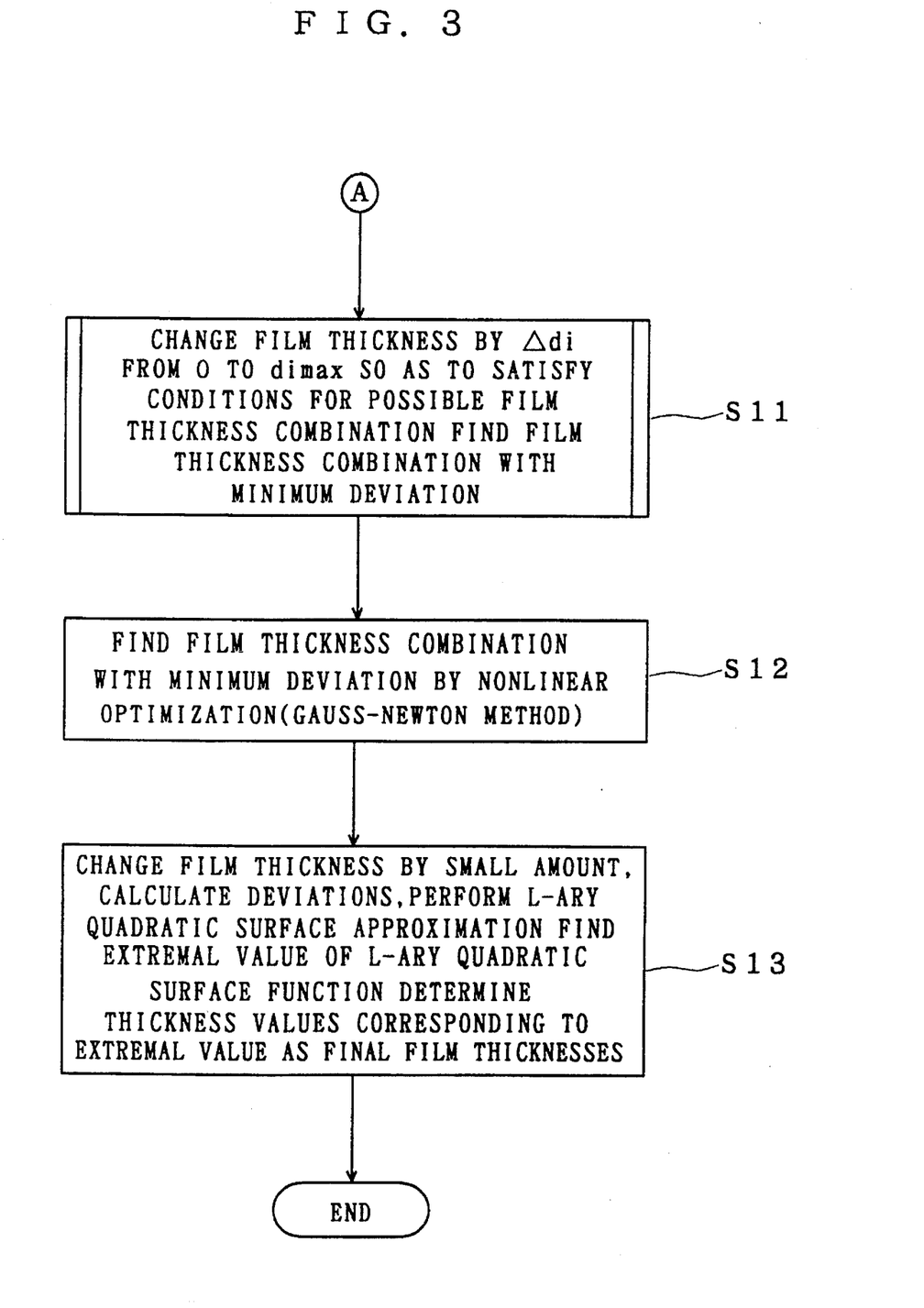

FIGS. 2 and 3 are flow charts showing a method of measuring a film thickness of a multilayered sample object according to a preferred embodiment of the present invention. A method of measuring thicknesses d1, d2 . . . dL of a sample object OB which includes L layers (L≧1) disposed on a substrate will be hereinafter described with reference to FIGS. 2 and 3.

(1) First, through the key board 53, an operator inputs the number L of the transparent films and optical constants such as refraction indexes n0 ($\lambda$), n1 ($\lambda$) . . . nL ($\lambda$) and absorption coefficients k0 ($\lambda$), k1 ($\lambda$) ... kL ($\lambda$) of each layer of the sample object OB with respect to various wavelengths (Step S1). The data are stored in a memory (not shown) of the control unit 50 and read whenever if necessary during computations which will be described later.

Figure 4:
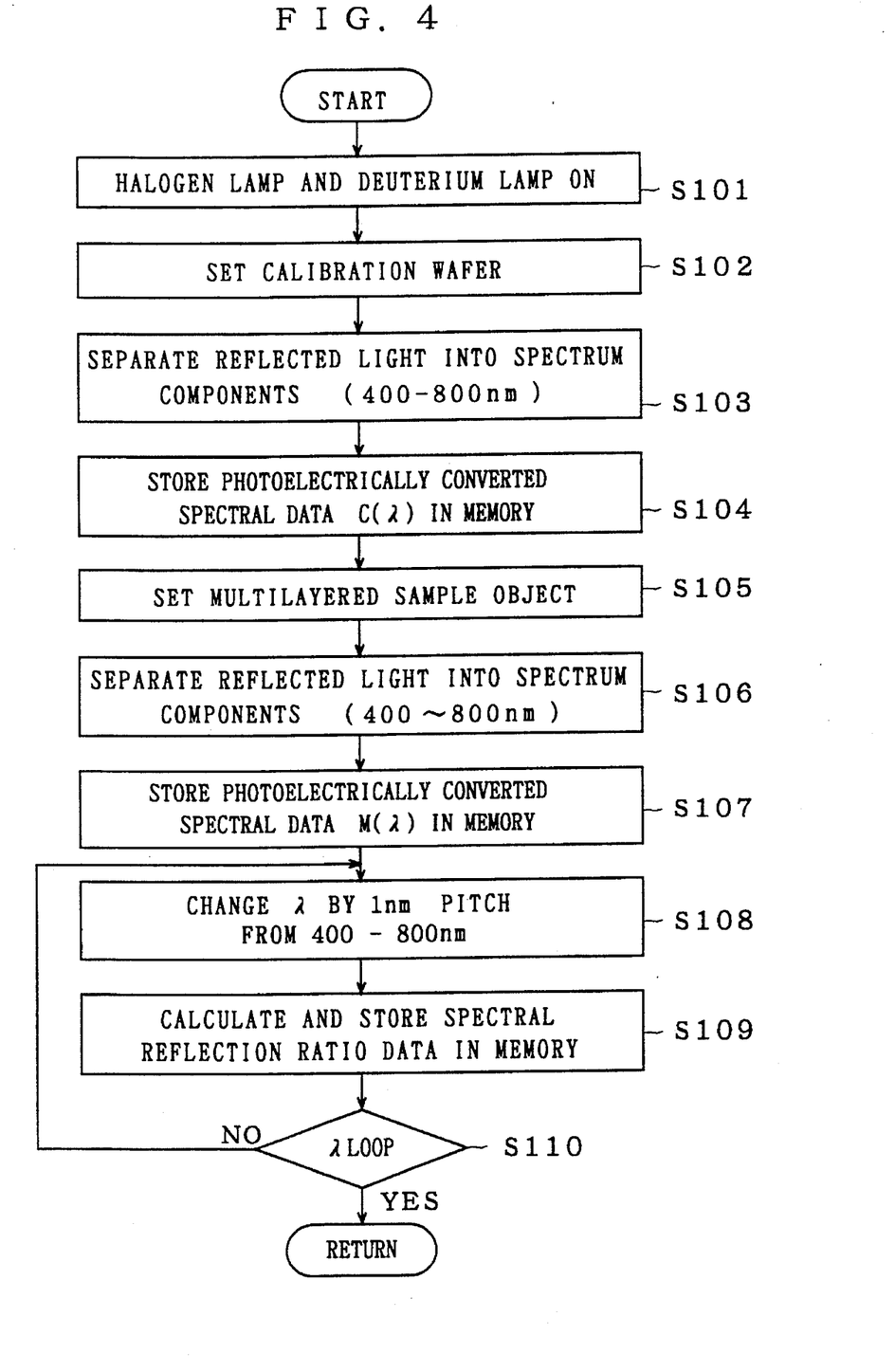
FIG. 4 is a flow chart showing a step of measuring spectral reflection ratios on a sample object.

(2) Next, at Step S2, reflection ratios $R_m$ ($\lambda$) of the sample object OB to a calibration wafer (e.g., silicon substrate) with respect to the observation wavelength range (from 400 to 800 nm, for example) are measured. The measurement is performed as follows as shown in FIG. 4.

First, at Step S101, the halogen lamp of the light source 21 is turned on. At Step S102, an operator sets the calibration wafer on the XY stage 40 causing light to be reflected by the calibration wafer and converged to a designated point on an optical axis through the objective lens 31, the beam splitter 32 and the tube lens 33. Only light passing through the pin hole 61 of the plate 62 is allowed into the spectroscopic unit 70 and separated into spectrum components within a wavelength range from 400 to 800 nm (Step S103). At Step S104, light entered the optical detector 72 is photoelectrically converted into spectral signals which will be supplied to the control unit 50 and stored as spectral data C ($\lambda$) in the memory of the control unit 50.

Following this, the operator detaches the calibration wafer from the XY stage 40 and places the sample object OB which is to be measured on the XY stage 40 (Step S105). In the same manner as above, light reflected by the sample object OB is guided into the spectroscopic unit 70, separated into spectrum components within the wavelength range from 400 to 800 nm (Step S106) and stored as spectral data M ($\lambda$) in the memory of the control unit 50 (Step S107).

Then, Steps S108 to S110 are repeated to read the spectral data C ($\lambda$) and M ($\lambda$) at appropriate pitches, for every 1 nm, for instance, within the wavelength range from 400 to 800 nm and to calculate the reflection ratios $R_m$ ($\lambda$) from Eq. 2 below:

$$Rm(\lambda) = \frac{M(\lambda)}{C(\lambda)} \times 100(\%) \qquad [2]$$

Data about the calculated reflection ratios (hereinafter "spectral reflection ratio data") are stored in the memory (Step S109).

The reflection ratios $R_m$ ($\lambda$) of the sample object OB with respect to the wavelengths from 400 to 800 nm are then plotted against a wavelength $\lambda$, thus developing an interference waveform.

(3) At Step S3 (FIG. 2), peaks and valleys are identified in the developed interference waveform in the observation wavelength range and the total number m of the peaks and valleys is found. At Step S4, whether the total number m of the peaks and valleys is not less than 2 is judged. If "YES" at Step S4, the sequence proceeds to Steps S5 to S7 but to Steps S8 and S9 if judged "NO" at Step S4, thereby finding possible combinations of the film thicknesses d1, d2 . . . dL of the transparent films and calculating possible ranges of the respective film thicknesses.

More Specifically, if "YES" at Step S3, the sequence proceeds to Step S5 where the sum OD of optical thicknesses of the respective films is calculated according to:

$$OD = 0.25 \times (m-1) \times \frac{\lambda 1 \times \lambda 2}{\lambda 2 - \lambda 1} \qquad [3]$$

where $\lambda 1$ is a first wavelength which is on the shorter wavelength side of the observation wavelength range. Thus, when the total number m of the peaks and valleys is 2 or larger, $\lambda 1$ is a wavelength which corresponds to a peak or a valley which is located at the shortest wavelength side. A second wavelength which is on the longer wavelength side of the observation wavelength range is indicated as $\lambda 2$. When the total number m of the peaks and valleys is 2 or larger, $\lambda 2$ is a wavelength which corresponds to a peak or a valley which is located at the longest wavelength side.

Once the sum OD of the optical thicknesses is known, only a limited number of the possible combinations of the film thicknesses d1, d2 . . . dL are left available. In other words, the combination (d1, d2 . . . dL) is determined by finding the film thicknesses d1, d2 . . . dL which satisfy:

$$(1-\gamma) \times OD \leq \sum_{i=1}^{L} (<ni> \times di) \leq (1+\gamma) \times OD \quad [4]$$

where di: a film thickness of an i-th transparent film from the substrate $<ni>$: an average refractive index of the i-th transparent film with respect to a wavelength $\lambda$ $\gamma$: the safety factor (described later)

In this preferred embodiment, whether the inequality [4] holds is judged after substituting in the inequality [4] at Step S6, whereby the number of computation steps is reduced (described in detail later). In the inequality [4], the safety factor $\gamma$ regarding differences between measurements and calculated values (due to the NA and the refractive index of the objective lens, noise, etc.) is equal to or larger than 0 but smaller than 1. In this embodiment, $\gamma=0.2$.

Once the sum OD of the optical thicknesses is found in this manner, the possible ranges of the respective film thicknesses can be calculated from the inequality [4]. That is, at Step S7, a possible film thickness range of each film is calculated according to:

$$0 \leq di \leq (1+\gamma) \times \frac{OD}{<ni>} \quad [5]$$

As can be understood from the inequality [5], the minimum possible film thicknesses of the transparent films is zero while the maximum possible film thicknesses $d_{imax}$ of the transparent films is:

$$dimax = (1+\gamma) \times \frac{OD}{<ni>} \quad [6]$$

Thus, if "YES" at Step S3, the sequence proceeds to Steps S5 to S7 to find a condition for a possible combination of the film thicknesses d1, d2 ... dL (inequality [4]) and to calculate the possible ranges of the respective film thicknesses d1, d2 ... dL (inequality [5]).

On the other hand, if "NO" at Step S3, it is impossible to directly calculate the sum OD of the optical thicknesses since the total number m of the peaks and valleys is less than 2. To deal with this, in this preferred embodiment, a condition for a possible combination of the film thicknesses d1, d2 ... dL is determined at Step S8, and possible ranges of the respective film thicknesses d1, d2 ... dL are calculated at Step S9. The reason why the condition for a possible combination and the possible film thickness ranges can be calculated at Steps S8 and S9 is as follows.

The number of peaks and valleys appearing in the observation wavelength range is approximately expressed as:

$$m = 4 \times \sum_{i=1}^{L} (<ni> \times di) \times \frac{\lambda_e - \lambda_s}{\lambda_s \times \lambda_e} \quad [7]$$

where $\lambda_s$ is a first wavelength which is located at the shortest wavelength side of the observation wavelength range and $\lambda_c$ is a second wavelength which located at the longest wavelength side of the observation wavelength range. Hence, $$m \leq 4 \times \sum_{i=1}^{L} (<ni> \times di) \times \frac{\lambda_e - \lambda_s}{\lambda_s \times \lambda_e} < m+1 \quad [8]$$

Therefore, considering the safety factor $\gamma$ (0<$\gamma$<1), $$m \leq \gamma = 4 \times \sum_{i=1}^{L} (<ni> \times di) \times \frac{\lambda_e - \lambda_s}{\lambda_s \times \lambda_e} < m+1+\gamma \quad [9]$$

In short, the inequality [9] is the condition for a possible combination of the film thicknesses d1, d2 ... dL of the transparent films. Similarly to the condition which is calculated at Step S6, setting this condition for a possible combination reduces the number of calculation steps. Whether the inequality [9] holds is judged prior to calculations which will be described later.

With the condition for a possible combination determined in this manner, the maximum value $d_{imax}$ of the film thickness of each transparent film is calculated from the inequality [9] as:

$$dimax = 0.25 \times \frac{m+1+\gamma}{<ni>} \times \frac{\lambda_s \times \lambda_e}{\lambda_e - \lambda_s} \quad [10]$$

That is, the film thickness of the i-th transparent film from the substrate could range from zero to $d_{imax}$, specifying the possible ranges of the film thicknesses d1, d2 ... dL.

(4) Next, at Step S10 (FIG. 2), film thickness pitches are determined for the respective transparent films. In this preferred embodiment, since nonlinear optimization is performed on film thickness values which are calculated through computations which will be described later, it is preferable to set the film thickness pitches at reasonably large values so that nonlinear optimization will not be trapped in local minimum and the computation time will be reduced. To this end, in this preferred embodiment, a film thickness pitch $\Delta di$ of the i-th transparent film from the substrate is calculated prior to calculation of film thicknesses at subsequent Step S11 (FIG. 3) as:

$$\Delta di = \frac{0.1}{4 \times <ni> \times \frac{\lambda_e - \lambda_s}{\lambda_s \times \lambda_e}} \quad [11]$$

The reason why the film thickness pitch $\Delta di$ is to be calculated here is as follows. That is, in an interference waveform which is obtained by irradiating light of the observation wavelength range (from $\lambda_s$ to $\lambda_c$), onto a sample object in which one transparent film (here, the i-th transparent film) alone is disposed on the substrate, the total number mi of peaks and valleys is approximately calculated as:

$$mi = 4 \times <ni> \times di \times \frac{\lambda_e - \lambda_s}{\lambda_s \times \lambda_e} \quad [12]$$

As can be understood from Eq. 12, since the total number mi varies with a change in the film thickness di, where the film thickness pitch $\Delta di$ is set at a large value, a change in the total number mi sometimes makes it impossible to find a minimum deviation point during a subsequent process step (Step S11) which will be described later. To avoid this, the film thickness pitch $\Delta di$ is preferably set smaller than a film thickness change which causes the total number mi to increase or decrease by 1. For example, the film thickness pitch $\Delta di$ is determined as one-tenth of the film thickness change. In this embodiment, the film thickness pitch $\Delta di$ is set at a value which is expressed by Eq. 12.

For instance, where $\lambda_s=400$ nm and $\lambda_c=800$ nm, the film thickness pitch $\Delta di$ of an $SiO_2$ film is set as:

$$\Delta di = \frac{0.1}{4 \times 1.457 \times \frac{800-400}{800 \times 400}} \quad [13]$$

$$= 13.7$$

The film thickness pitch $\Delta di$ of an $Si_3N_4$ film is set as:

$$\Delta di = \frac{0.1}{4 \times 2.045 \times \frac{800-400}{800 \times 400}} \quad [14]$$

$$= 9.7$$

As understood from the description above, the film thickness pitch $\Delta di$ becomes smaller as the refractive index of the transparent film becomes larger and the observation wavelength range becomes narrower.

(5) At Step S11 (FIG. 3), a deviation between theoretical spectral reflectance and measured spectral reflectance with respect to the respective film thicknesses (d1, d2 ... dL) is calculated while changing the thicknesses of the respective transparent films (d1, d2 ... dL) by the film thickness pitch Δd1 which is yielded at Step S10 in the range from zero to the respective maximum values ($d_{1max} \ldots d_{Lmax}$), thereby finding a film thickness combination (d1, d2 ... dL) in which the deviation becomes the smallest. In the following, a case where three transparent films are formed on the substrate will be taken as an example to describe Step S11 in detail with reference to FIG. 5.

Figure 5:
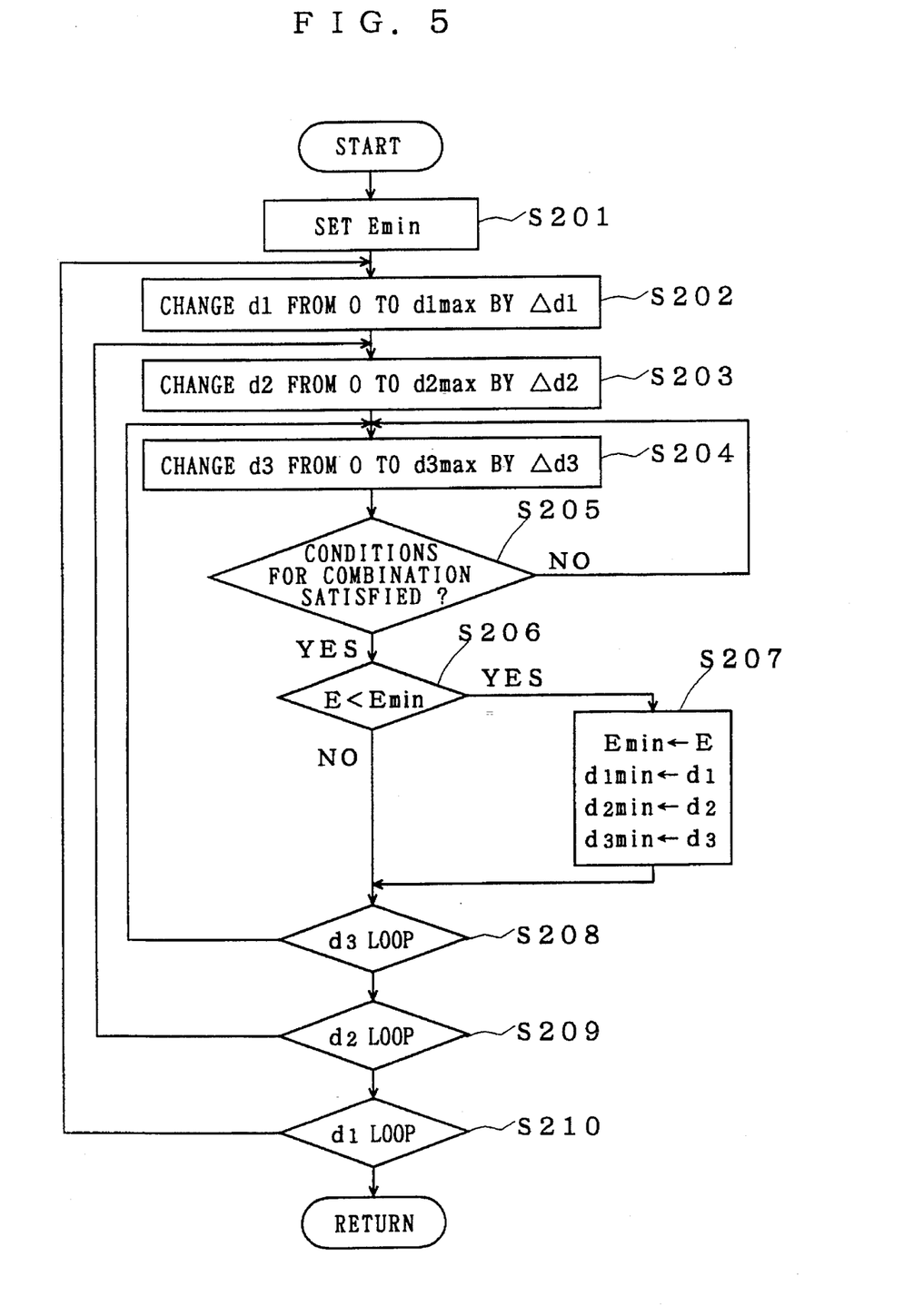
FIG. 5 is a flow chart showing calculation steps of finding a film thickness combination which causes the deviation to be minimum.

FIG. 5 is a flow chart showing computation steps for finding a film thickness combination (d1, d2 ... dL) in which the deviation becomes the smallest.

First, at Step S201, a deviation E is set at an appropriate value Emin. As termed herein, "deviations E" refer to deviations for evaluating differences between measured reflection ratios $R_m(\lambda)$ which are calculated based on actual measurements and theoretical reflection ratios $R_c(\lambda)$ which are theoretically calculated. Where the wavelength range is from $\lambda_s$ to $\lambda_e$ and the thicknesses of the respective transparent films are d1, d2 and d3, a deviation E is:

$$E(\lambda_s, \lambda_e; d1, d2, d3) = \sum_{\lambda=\lambda_s}^{\lambda_E} [W(\lambda) \times \{Rm(\lambda) - Rc(\lambda)\}^2] \quad [15]$$

In Eq. 15, $W(\lambda)$ is a weight function. As $W(\lambda)$, a weight function which is in proportion to an actual amount of received light can be used for instance. The theoretical reflection ratios $R_c(\lambda)$ are calculated in a conventional manner from optical constants such as refraction indexes and absorption coefficients of each transparent film of the sample object OB, the wavelength $\lambda$ and the values tentatively determined as the film thicknesses of the respective transparent films. Although it is desirable to take measurements from various objects OB and determine an appropriate value for the deviation Emin based on the measurements, the deviation Emin may be simply set at a sufficiently large value.

Having set the deviation Emin, at Step S202, the thickness d1 is changed by the film thickness pitch Δd1 in the range from zero to the maximum value $d_{1max}$. The thickness d2 is changed by the film thickness pitch Δd2 in the range from zero to the maximum value $d_{2max}$ at Step S203, and the thickness d3 is changed by the film thickness pitch Δd3 in the range from zero to the maximum value $d_{3max}$ at Step S204.

At Step S205, it is judged whether the values calculated as d1, d2 and d3 satisfy the conditions for the film thickness combination which are set at Steps S6 and S8 (FIG. 2). If "YES" at Step S205, the sequence proceeds to Step S206 to calculate a deviation E between the theoretical and measured reflection ratios with respect to the tentative film thickness values d1, d2 and d3 and to thereafter judge whether the calculated deviation E is smaller than the deviation Emin. If "YES" at Step S206, the sequence proceeds to Step S207 at which the deviation E is replaced with the deviation Emin and the tentative film thickness values d1, d2 and d3 are replaced with film thickness values d1min, d2min and d3min. In other words, if the newly computed deviation is smaller than the former deviation, the computed deviation E and the tentative film thickness values d1, d2 and d3 are maintained.

On the other hand, if "NO" at Step S205, the sequence returns to Step S204 without proceeding to Step S206 to change the thickness d3 by the film thickness pitch Δd3.

This process (Steps S205 to S207) is repeated until it is judged that a computation loop is completed at Steps S208 to S210. Thus, a combination of the film thicknesses (d1min, d2min, d3min) which causes the deviation E to be minimum is found.

At last, the film thickness values d1min, d2min and d3min replace the tentative film thickness values d1, d2 and d3, respectively.

As described above, in this embodiment, Step S205 judges whether the tentative film thickness values d1, d2 and d3 of the transparent films satisfy the conditions for the film thickness combination, and the deviation E is calculated only when the conditions are satisfied. Hence, calculations are omitted where unnecessary, which allows fast computation.

(6) Next, at Step S12 (FIG. 3), from the combination of the film thicknesses (d1, d2 ... dL), a more accurate combination of the film thicknesses (d1, d2 ... dL) is found by nonlinear optimization (e.g., Gauss-Newton method). The Gauss-Newton method is a conventional method and will not be therefore described here.

(7) At Step S13 (FIG. 3), L-ary quadratic hypersurface approximation is performed utilizing the least square method. From a resultant quadratic surface function, the film thickness combination (d1, d2 ... dL) which causes the deviation E to have a minimum value is identified. More specifically, the combination is found in the following manner.

First, the thickness values tentatively determined for the respective transparent films at Step S12 are each increased or decreased by a very small amount (2 nm, for instance) to find combinations. The number of the combinations to be found here is equal to or larger than the value which is expressed as below:

$$L + 1 + \sum_{i=1}^{L} i \quad [16]$$

For instance, it is necessary to find six or more combinations if there are two transparent films, ten or more combinations if there are three transparent films, and fifteen or more combinations if there are four transparent films.

The computed deviations E are then approximated by L-ary quadratic hypersurface approximation utilizing the least square method, thereby establishing a quadratic surface function as below:

$$E = C_0 + \sum_{k=1}^{L} C_k d_k + \sum_{i=1}^{L} \left( \sum_{j=i}^{L} C_F \cdot d_i \cdot d_j \right) \quad [17]$$

where $F = \sum_{k=1}^{i-1} (L - k + 1) + j + i + L + 1$ $C_0, C_1, C_2$: coefficients Following this, from the resultant quadratic surface function, a combination (d1, d2 ... dL) which corresponds to the smallest deviation E is found, which is to calculate the minimum value for the deviation E. Hence, if the deviation E is partially differentiated by the thickness d1, d2 ... or dL and a resultant solution is zero, combination of the thicknesses d1, d2, ... dL causes the deviation E to be minimum. With respect to where one transparent film is disposed on the substrate (L=1: monolayer film), where two transparent films are stacked on the substrate (L=2: two-layered film), where three transparent films are formed on the substrate (L=3: three-layered film), and where four transparent films are stacked on the substrate (L=4: four-layered film), for example, the type of the function and an extremal value condition are as follows:

<Monolayer film (L=1)>

The quadratic surface function is expressed as:

$$E = C_0 + C_1 d_1 + C_2 d_1^2 \quad \{18\}$$

A condition for an extremal value is:

$$\frac{\partial E}{\partial d1} = C_1 + 2C_2 d1 = 0 \quad [19]$$

<Two-layered film (L=2)>
The quadratic surface function is expressed as:

$$E = C_0 + C_1 d_1 + C_2 d_2 + C_3 d_1^2 + C_4 d_1 d_2 + C_5 d_2^2 \quad \{20\}$$

A condition for an extremal value is:

$$\frac{\partial E}{\partial d1} = C_1 + 2C_3 d1 + C_4 d_2 = 0 \quad [21]$$

$$\frac{\partial E}{\partial d2} = C_1 + C_4 d_1 + 2C_5 d_2 = 0$$

<Three-layered film (L=3)>
The quadratic surface function is expressed as:

$$E = C_0 + C_1 d_1 + C_2 d_2 + C_3 d_3 + C_4 d_1^2 + \quad [22]$$
$$C_5 d_1 d_2 + C_6 d_1 d_3 + C_7 d_2^2 + C_8 d_2 d_3 + C_9 d_3^2$$

A condition for an extremal value is:

$$\frac{\partial E}{\partial d1} = C_1 + 2C_4 d_1 + C_5 d_2 + C_6 d_3 = 0 \quad [23]$$

$$\frac{\partial E}{\partial d2} = C_2 + C_5 d_1 + 2C_7 d_2 + C_8 d_3 = 0$$

$$\frac{\partial E}{\partial d3} = C_3 + C_6 d_1 + C_8 d_2 + 2C_9 d_3 = 0$$

<Four-layered film (L=4)>
The quadratic surface function is expressed as:

$$E = C_0 + C_1 d_1 + C_2 d_2 + C_3 d_3 + C_4 d_4 + C_5 d_1^2 + \quad [24]$$
$$C_6 d_1 d_2 + C_7 d_1 d_3 + C_8 d_1 d_4 + C_9 d_2^2 + C_{10} d_2 d_3 +$$
$$C_{11} d_2 d_4 + C_{12} d_3^2 + C_{13} d_3 d_4 + C_{14} d_4^2$$

A condition for an extremal value is:

$$\frac{\partial E}{\partial d1} = C_1 + 2C_5 d_1 + C_6 d_2 + C_7 d_3 + C_8 d_4 = 0 \quad [25]$$

$$\frac{\partial E}{\partial d2} = C_2 + C_6 d_1 + 2C_9 d_2 + C_{10} d_3 + C_{11} d_4 = 0$$

$$\frac{\partial E}{\partial d3} = C_3 + C_7 d_1 + C_{10} d_2 + 2C_{12} d_3 + C_{13} d_4 = 0$$

$$\frac{\partial E}{\partial d4} = C_4 + C_8 d_1 + C_{11} d_2 + C_{13} d_3 + 2C_{14} d_4 = 0$$

By solving the equations established in the manner above (e.g., Eqs. 19, 21, 23 and 25), the film thickness values d1, d2 ... dL which cause the deviation E to be minimum are found. The accuracy of film thickness measurement is enhanced accordingly.

Thus, according to this embodiment, the total number m of the peaks and valleys in a measured interference waveform is found (Step S3) and the possible ranges for the film thicknesses of the respective transparent films are determined based on both the total number m of the peaks and valleys and two wavelengths specified within the observation wavelength range (i.e., the first wavelength which is located in the shorter wavelength side and the second wavelength which is located in the longer wavelength side) (Steps S7 and S9). Hence, there is no need to input the film thickness ranges prior to measurement. Further, the total number of the computation steps is reduced, which substantially shortens the computation time. Still further, according to this embodiment, by performing predetermined measurement processes (i.e., FIGS. 2 and 3), it is possible to measure the film thicknesses of the respective transparent films regardless of the number of the transparent films.

In addition, since the total number m of the peaks and valleys in an interference waveform is found (Step S3), whether the total number m is not less than 2 is then judged, and the film thickness ranges for the respective transparent films are then determined in accordance with the judgement, it is possible to more accurately determine the film thickness ranges and hence to improve the reliability of calculation of the film thicknesses.

After finding a possible combination of film thickness values of the transparent films, that is, after finding conditions for the combination (Steps S6 and S8) and prior to calculation of a deviation at Step S206, whether the tentative film thickness values satisfy the conditions is judged. Calculation of a deviation will not be performed unless the conditions are satisfied. In other words, when the conditions are not satisfied (that is, when the combination of film thickness values is obviously improper), calculation of a deviation is simply omitted. This reduces the computation time. However, it is to be noted that setting of the conditions for a combination (Steps S6 and S8) and judgement of whether the conditions are satisfied (Step S205) are not necessarily essential.

With respect to Step S11 at which a possible combination of film thickness values of the transparent films is found, the film thicknesses can be very accurately found since the combination of the film thickness values is optimized by nonlinear optimization (Step S12) in this embodiment. The accuracy of film thickness measurement is further enhanced by Step S13. These steps S12 and S13, however, are not necessarily requisite.

Although the embodiment above requires to calculate a ratio of spectral energy which is measured on the sample object OB to spectral energy which is taken on a calibration wafer (silicon substrate), i.e., spectral reflection ratios, spectral reflectances may be calculated instead.

While the invention has been described in detail, the foregoing description is in all aspects illustrative and not restrictive. It is understood that numerous other modifications and variations can be devised without departing from the scope of the invention.

We claim:

1. A method of measuring thicknesses of one or more transparent films of a sample object which are stacked on a substrate of said sample object, said method comprising the steps of:

(a) determining the number of said transparent films and optical constants of each one of said transparent films;

(b) irradiating light of a predetermined observation wavelength range upon said sample object, measuring spectral reflectances and deriving an interference waveform;

(c) finding the total number of peaks and valleys in said interference waveform and determining possible film thickness ranges for said transparent films based on the total number of peaks and valleys and first and second wavelengths which are respectively located in a shorter wavelength side and a longer wavelength side within said observation wavelength range; and (d) calculating a deviation between theoretical spectral reflectance and measured spectral reflectance with respect to tentatively determined film thickness values while changing said tentatively determined film thickness values each by a predetermined film thickness pitch within said possible film thickness ranges to find a film thickness combination which causes the deviation to be minimum, thereby finally determining the thicknesses as the thicknesses of said transparent films.

2. The method of claim 1, wherein said step (c) comprises the steps of:

(c-1) finding the total number of peaks and valleys in said interference waveform;

(c-2) judging whether the total number is less than 2 or not;

(c-3) determining a wavelength which is related to a peak or a valley which is located on the shorter wavelength side in said interference waveform as said first wavelength and determining a wavelength which is related to a peak or a valley which is located on the longer wavelength side in said interference waveform as said second wavelength if the total number is not less than 2 to thereby determine said possible film thickness ranges of said transparent films based on said first and second wavelengths; and (c-4) calculating an approximate total number of peaks and valleys which could be found within said observation wavelength range as the total number based on wavelengths which are located at the shortest and longest wavelength sides and said optical constants regarding said transparent films if the total number is less than 2, determining the wavelength which is located at the shortest wavelength side of said observation wavelength range as said first wavelength while determining the wavelength which is located at the longest wavelength side of said observation wavelength range as said second wavelength, and thereafter determining said possible film thickness ranges of said transparent films based on said approximate total number of peaks and valleys and said first and second wavelengths.

3. The method of claim 2, wherein said step (c-3) comprises a step of calculating a sum of optical thicknesses of said transparent films based on said first and second wavelengths and the total number of peaks and valleys found at said step (c-1) and thereafter determining a certain range around said sum as a first condition for a film thickness combination, wherein said step (c-4) includes a step of determining a certain range around said approximate total number of peaks and valleys as a second condition for a film thickness combination, and wherein said step (d) includes a step of judging whether said tentatively determined film thicknesses satisfy said first and second conditions for a film thickness combination prior to calculation of a deviation between theoretical spectral reflectance and measured spectral reflectance with respect to said tentatively determined film thicknesses, and thereafter calculating a deviation only when said first and second conditions for a film thickness combination are satisfied.

4. The method of claim 3, wherein prior to said step (d), said film thickness pitch is set for each one of said transparent films at a value which is smaller than a film thickness change which causes the total number of peaks and valleys appearing in said interference waveform to change by 1 with a change in said tentatively determined film thicknesses, and wherein said film thickness combination which is found at said step (d) is optimized by nonlinear optimization in finding thicknesses of said one or more transparent films.

* * * * *